United States Patent
Acher et al.

(10) Patent No.: US 6,708,880 B1
(45) Date of Patent: Mar. 23, 2004

(54) SYSTEM AND METHOD FOR AUTHENTICATING MANUFACTURED ARTICLES PROVIDED WITH MAGNETIC MARKING AND METHOD FOR MARKING SUCH ARTICLES

(75) Inventors: Olivier Acher, Monts (FR); Jean-Claude Joubert, Venon (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/204,824

(22) PCT Filed: Feb. 27, 2001

(86) PCT No.: PCT/FR01/00566

§ 371 (c)(1),
(2), (4) Date: Aug. 23, 2002

(87) PCT Pub. No.: WO01/65283

PCT Pub. Date: Sep. 7, 2001

(30) Foreign Application Priority Data

Feb. 29, 2000 (FR) .............................................. 00 02541

(51) Int. Cl.⁷ .................................................. G06K 7/08
(52) U.S. Cl. ................. 235/451; 340/572.1; 340/572.2; 340/571
(58) Field of Search ................................. 235/451, 385, 235/449, 435, 493; 340/572.1, 572.3, 572.6, 571, 572.2; 148/108, 122, 311, 312

(56) References Cited

U.S. PATENT DOCUMENTS

| | | | |
|---|---|---|---|
| 4,581,524 A | | 4/1986 | Hoekman et al. |
| 4,823,113 A | * | 4/1989 | Hasegawa .................... 340/551 |
| 4,960,651 A | * | 10/1990 | Pettigrew et al. ........... 340/551 |
| RE35,042 E | * | 9/1995 | Anderson et al. ........ 340/572.6 |
| 5,532,598 A | | 7/1996 | Clark, Jr. et al. |
| 6,137,412 A | * | 10/2000 | Herzer ...................... 340/572.6 |
| 6,551,416 B1 | * | 4/2003 | Herzer ......................... 148/108 |
| 6,556,139 B2 | * | 4/2003 | Manov et al. ........... 340/572.6 |

FOREIGN PATENT DOCUMENTS

| | | |
|---|---|---|
| EP | 0 383 059 | 8/1990 |
| FR | 2 711 246 | 4/1995 |
| FR | 2 779 266 | 12/1999 |
| WO | WO 97/24734 | 7/1997 |
| WO | WO 98/36393 | 8/1998 |

* cited by examiner

Primary Examiner—Karl D. Frech
Assistant Examiner—Edwyn Labaze
(74) Attorney, Agent, or Firm—Anderson Kill & Olick, PC.; Eugene Lieberstein; Michael N. Meller

(57) ABSTRACT

The present invention relates to a system for authenticating manufactured articles provided with magnetic markings, by means of a device for detecting such markings, in which each marking comprises at least one amorphous ferromagnetic filament, of diameter less than 20 $\mu$m provided with a glass sheath of thickness less than 10 $\mu$m, in which the detection device is a portable device for detecting such ferromagnetic filaments.

The present invention also relates to a method for marking such articles.

14 Claims, 2 Drawing Sheets

SYSTEM AND METHOD FOR AUTHENTICATING MANUFACTURED ARTICLES PROVIDED WITH MAGNETIC MARKING AND METHOD FOR MARKING SUCH ARTICLES

TECHNICAL FIELD

The present invention relates to a system for authenticating manufactured articles provided with magnetic markings and a method for marking such articles. In particular, the field of the invention relates to the detection of infringement of trademark rights for textile articles or leather goods. But it can also be related to that of the detection of self-sticking labels on any object (can, wine-bottle etc.).

STATE OF PRIOR ART

Infringement is a problem of great concern for the manufactured products industry, and in particular the luxury goods industry. A certain number of means: visual marks, product engraving etc. have been developed to enable authentication of guaranteed origin products.

But, in the field of textile articles or leather goods, the introduction of a visual mark (hologram, laser engraving etc.) requires unpacking the article and carrying out a detailed visual examination to detect the marking. Furthermore, a marking which is not integrated into the article does not allow authentication of the article once it has been used, and is without its labels and its packaging.

It is also possible to carry out magnetic marking with the aid of a magnetically soft material. In fact, an elongated element in a substance of this type, when submitted to an alternating magnetic field high enough to reach saturation, generates harmonics which can be detected. It is also possible to detect a high frequency signal emitted when reversing the magnetisation of a magnetic material during application of an external magnetic field (Barkhausen effect), this effect being observed only on magnetic substances having a hysteresis cycle with high remanence and a weak coercive field.

As described in document referenced [1] at the end of the description, the use of ferromagnetic filaments to produce such a marking is known. This technique is used in many devices for electronic surveillance (EAS), such as those described in the document referenced [2]. In the field of electronic surveillance, the detection of an article is carried out in a non-cooperative manner: the magnetically soft material must be able to be detected without its carrier forcing himself to ease detection by a detection frame. Such a frame can be constituted of detection antennae monitoring an examination zone of large cross-section, in order to be able to detect over a sufficiently extensive zone, at the exit from a cash desk, for example, or at the exit from a shop.

On the other hand, such a co-operative magnetic detection, in which an individual possessing a device for detecting the presence of magnetically soft material, effectively tries to verify the existence of magnetic markers incorporated in an object, has not been greatly developed. Existing developments relate to systems for individual identification of objects, such as access badges, as described in documents referenced [3] and [4]. These systems are characterised on the one hand by an operation based on a precise spatial detection of a plurality of separate magnetic elements, and on the other hand by the pence on the object of a code allowing comparison of the information resulting from this detection, and from this code to certify the identity of the product. It is necessary to differentiate between these systems, which shall be called identification systems, inasmuch as they serve to ensure the identity of a single object, and the authentication system according to the invention, which serves to ensure the authenticity of the source.

In the devices according to prior art, ferromagnetic wires are sometimes used. When it concerns electronic surveillance, their diameter often exceeds 100 $\mu$m. In electronic surveillance systems it is, in fact, necessary to have a sufficient quantity of material in order to allow detection in a fairly large examination region (of the order of 1 m$^3$). Fire, since the strenth of the alternating magnetic field to which the public is submitted must be low, the wires must be able to react to a weak field, typically lower than 80 A/m.

The document referenced [8] describes a method and a rote detection sensor for used objects, with the aim of electronic surveillance. This method is different from prior art in that, as detection means, it utilises a physical property of amorphous or nano-crystalline metals; the variability of magnetic permeability with the magnetic field applied in the longitudinal direction of the element. Detection is thus no leer carried cut, as in prior art, with a magnetic field alone, but with a magnetic field and an electromagnetic field; an electromagnetic field for long range examination and a modulation field, a so-called variable magnetic field, for short range.

The aim of the invention is to produce a magnetic marking for manufactured articles, for example textiles or leather goods, which has the advantage of being invisible, which can be integrated during manufacture, and which remains present t the lifetime of these articles. A portable detection system of limited size then makes it possible to detect the presence or absence of magnetic marking, without it being necessary to proceed with a detailed examination of the product or unpacking it.

DESCRIPTION OF THE INVENTION

The invention relates to a system for authenticating manufactured articles provided with magnetic markings, by means of a device for detecting such markings, in which each marking apprises at least one amorphous ferromagnetic filament, the number n of these filaments being for example less than 10, of diameter less than 20 $\mu$m provided with a glass sheath of thickness less than 10 $\mu$m, characterised in that the detection device is a portable device for detecting such ferromagnetic filaments, and in that the ferromagnetic filament or filaments have a saturation field of at least 320 A/m.

These filaments have, for example a length comprised between 1 cm and 10 cm.

Advantageously, the portable device has a detection zone of a volume comprised between $10^{-3}$ d$^3$ and 1 d$^3$. The filament or filaments have a total mass not exceeding 1 mg. Advantageously, the filaments comprise between 18 and 35% of Si+B, of cobalt or iron of more than 40% and possibly nickel (<10%), and substances such as: Mo, Zr, Ge, Cr, Mn, V, Ti, C, with content less than 7%.

The wires can have a negative or positive magnetostriction.

The present invention also relates to a method for marking a manufactured article characterised in that at least one amorphous ferromagnetic filament of diameter lower than 20 $\mu$m is integrated, provided with a glass sheath of thickness less than 10 $\mu$m and having a saturation field of at least 320 A/m in a zone for this article, in such a way as to allow authentication of the latter by means of a detection device.

The filaments can be integrated by weaving or by stitching. These filaments can be inserted in a textile label, in a textile logo, or more generally in a predetermined part of the article. The filaments can be inserted by sewing, stitching, embroidery methods, or when the material is woven. The filaments can be incorporated in a textile thread, which can then be used during production of the material (as certain warp or weft threads), or used for sewing or embroidery operations, or for top stitching (in particular for leather goods).

Advantageously the authentication is carried out at several centimeters at most from the manufactured article.

The invention is clearly different from prior art systems, in particular for the following reasons:

- The detection device according to the invention has an examination volume which is neither as big as electronic surveillance systems, nor as small as identification systems, which require precise positioning (of the order of mm) of several magnetic markers juxtaposed in a precise layout relative to each other.
- The magnetic response of the marked article ensures that there is no detection by anti-theft detection frames (either the quantity is too small to ensure detection at distance, or the material saturation field is too strong to observe a significant non-linearity in the examination zone).
- Each magnetic filament is inserted in the textile article during the manufacturing process, or incorporated into the label or the trademark logo, or into the label comprising the treatment recommendations. It is designed to be an integral part of the article over the whole of its lifetime, under normal conditions, contrary to electronic surveillance markers which can either be de-activated or taken off, but which in any case become useless or potentially carriers of false alarms after exiting the shop.
- The glass sheath enclosing each magnetic filament is useful for protecting the magnetic material against corrosion by oxidation during the lifetime of the article, and in particular during washing or dry cleaning.
- Each identification ferromagnetic filament is invisible to the naked eye; there is therefore no need to hide it.
- Each ferromagnetic filament is flexible, comfortable, and does not involve any special restriction of use of a textile.
- Each ferromagnetic filament is integrated into the article concerned by a textile method (weaving, embroidery, stitching etc.) and not, as in the case of electronic surveillance by a sticking or assembly type method etc. or, as in the case of badge production, by a plastifying method.
- Relative to visual marks, the method according to the invention has the advantage of not requiring in-depth visual examination by the checking personnel, for example, by customs officers.
- The method according to the invention does not need any manipulation intended to make a label or a control mark visible, since the authentication device is capable of detection within a limited volume (from $10^{-3}$ dm$^3$ to 1 dm$^3$), but sufficient to avoid the necessity of unfolding the textile article or of separating articles arranged in piles.

DETAILED DESCRIPTION OF EMBODIMENTS

Figure 1:
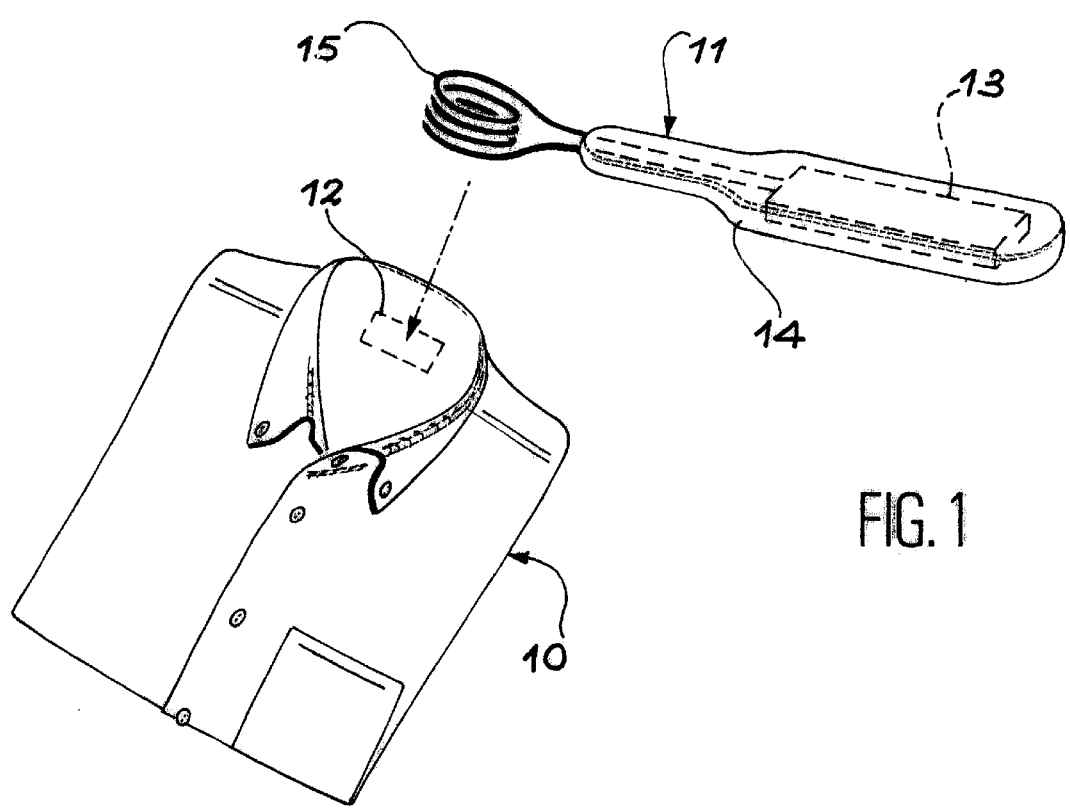
FIGS. 1 and 2 show the system according to the invention.

As shown in FIG. 1, the invention relates to authenticating a manufactured article 10, for example a textile article or a leather goods article, a shirt in this case, by means of a device 11 for detecting electromagnetic markings inserted in a predetermined area 12 of said article 10. In the figure, said device is shown diagrammatically with an excitation-detection housing 13, contained in a handle 14 and an excitation-detection antenna 15 linked with it.

A limited number of n ferromagnetic filaments 17 (n·10) of very small diameter (less than 20 µm) sheathed with glass (glass thickness less than 10 µm), is integrated in this zone 12 enabling authentication of the article 10 by the detection device. The preferred length of these filaments is comprised between 1 cm and 10 cm.

These filaments can either be separated, or assembled together (by planting, reaming etc.). These filaments can be inserted in a textile label, in a textile logo, or more generally in a predetermined textile part of the manufactured article. Any manufactured article comprising at least a part of woven fabric, a sewing (such as a watch strap, or a leather goods article), or an embroidery can easily be marked. The filaments are invisible to the naked eye, especially since they are integrated with the textile threads.

Figure 2:
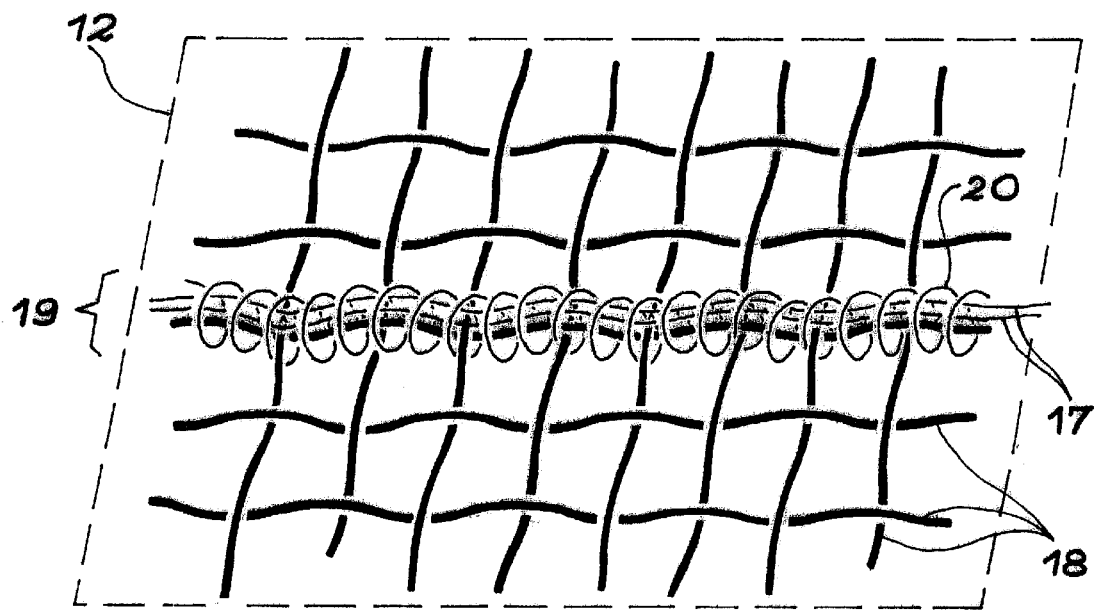

In FIG. 2, the ferromagnetic filaments 17 are assembled with a thread 18 of the textile weft to form, together with a warp thread 20, a composite covered thread 19.

These very thin filaments can either be inserted by sewing, stitching or embroidery methods, or inserted when the fabric is woven.

In order to facilitate manipulation of this limited number of filaments, they can be incorporated into a textile thread, which is then used during production of a fabric (as certain weft or warp threads), or used for sewing or embroidery operations, or for topstitching (in particular for leather goods).

These glass sheathed thin ferromagnetic filaments can be produced by drawing from a nucleus of molten metal contained in a borosilicate glass tube as described in the document referenced [5]. They can have the following compositions: CoFeSiB, CoSiB, FeSiB, with a proportion of Si+B greater than 18% and lower than 35% in order to obtain an amorphous material, and with Co and Fe at greater than 40%. These principle constituents can have additions of elements such as: Ni (from 0 to 20%), Mo, Zr, Ge, Cr, Mn, V, Ti, C or other metals or metalloids with contents lower than 7%.

These ferromagnetic filaments can have a positive magnetostriction, in which case they show a high Barkhausen jump, or a negative magnetostriction, in which case they have no Barkhausen jump. The properties of such materials depending on their composition, are well known in prior art, as described in the document referenced [6].

Production of textile threads containing ferromagnetic filaments in order to make fabrics has already been envisaged in the document referenced [7], with a totally different perspective, which led to using a significantly large quantity of magnetic threads, and threads of significant length, and which did not take into account the production of embroidery, sewing, or leather goods.

The quantities of material involved in the present invention, together with their properties ensure, on the one hand the possibility of detection of magnetically soft materials with the aid of a short range harmonic detection system, but also ensure that these materials will not be detected by the surveillance porticos of shops. These filaments are, in fact, intended to remain on the manufactured articles, and thus must not be detected by electronic surveillance porticos through which the wearer of the textile article may have to pass. In order to do this, in particular one can:

limit the quantity of ferromagnetic filaments, by not exceeding a volume of $10 \text{ cm} \times 1000 \mu m^2 = 0.1 \text{ mm}^3$, that is to say a mass of ferromagnetic filaments below 1 mg, raise the saturation field of a filament, beyond the values used in the electronic surveillance porticos. The international standards setting the authorized maximum value of the field applied to individuals at about 80 A/m, one can take a saturation field which is at least the quadruple of this value. In any case, the saturation field must not exceed 1700 A/m in the volume examined, to avoid complicating the cooperative detection, and to avoid the signals from neighboring metallic objects disturbing the signal. A detection device, hand-held, which creates a magnetic field in the detection volume but which does not expose the operator to excessive field values, is very simple to develop for those skilled in the art.

discriminate the detection by using the special properties of ferromagnetic filaments sheathed in glass when they are set side by side. Their interactions bring about a modification of their hysteresis cycle, which can result in a modification of the signal remitted following an excitation related to the application of a field.

Example of Embodiment

Figure 3:
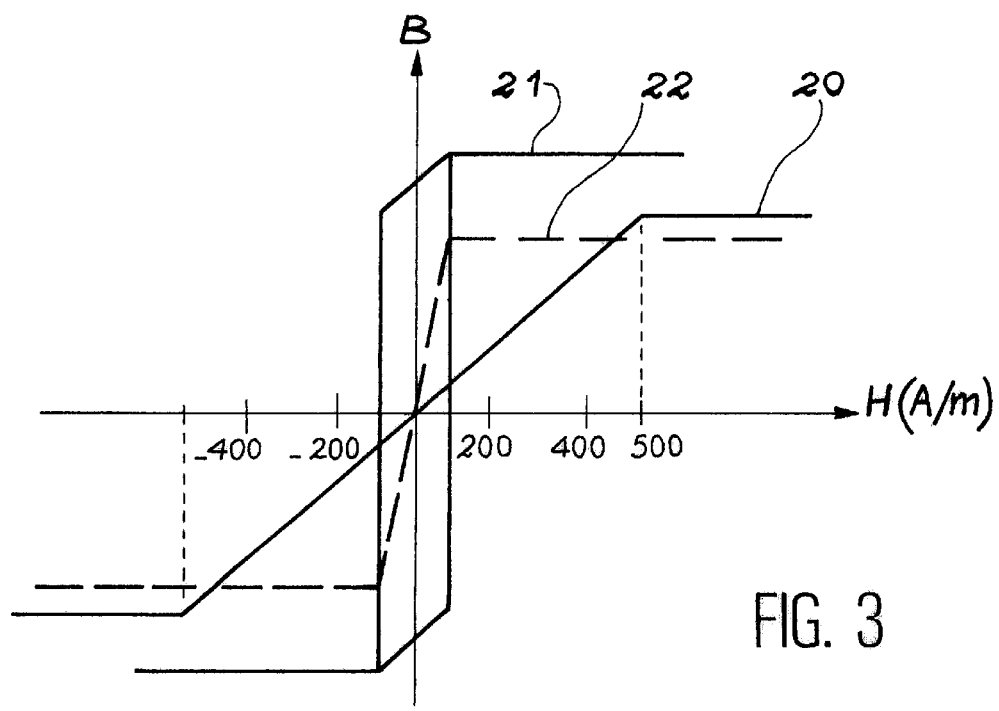
FIG. 3 shows the hysteresis cycles of magnetic filaments used in a first embodiment example.

In a first embodiment, amorphous ferromagnetic filaments sheathed in glass are used, obtained by drawing a glass tube filled with molten metal. The ferromagnetic core has a diameter of about 8 $\mu$m, and the glass sheath has a thickness of about 3 $\mu$m. The composition of the ferromagnetic material is Co68Mn7Si12B13, which has negative magnetostriction, and a linear hysteresis cycle, reversible up to a saturation field, which is 500 A/m. The saturation magnetisation is 7000 Gauss in S.i. FIG. 3 shows the hysteresis cycle 20 of such a filament, together with hysteresis cycles 21 and 22 of two different magnetic markers intended to be detected by electronic surveillance porticos (saturation field·80 A/m).

One or several ferromagnetic filaments are assembled together with a textile thread (cotton, silk, synthetic fiber etc.) by reaming. One or several of these threads are used to produce one or several seams of the textile article to be authenticated.

The detection device is constituted of two first bobbins of about 5 cm in diameter, separated by 5 cm, and supplied by an alternating current at 1 kHz to obtain a peak value of at least 500 A/m for the magnetic field between the bobbins. Two second detection bobbins comprising a large number of turns (1000 turns), are arranged coaxially with the first, and their signal is processed (by subtraction and then by search for high harmonics), in order to determine whether a magnetic thread with a saturation lower than or equal to 500 A/m is present in the examination zone. If there is detection, the detection device then reduces the level of the field, such that it does not exceed 200 A/m. Thus one verifies that detection no longer takes place, which clearly indicates the presence of a magnetically soft material with saturation field lower than 200 A/m. This material can therefore not be a marker associated with an electronic surveillance system.

In a second embodiment, ferromagnetic filaments of Co69Fe5Si12B14 of a diameter of around 4 $\mu$m are used, with a positive magnetostriction coefficient, with a glass thickness of about 6 $\mu$m. This material has a Barkhausen jump, for a saturation field of 70 A/m. A composite thread is produced from four filaments of this type, plus a classic textile thread, by reaming. This composite thread is then used to produce the fabric used for the label or the logo of the trademark to be protected. The length of the covered composite thread present in the label or the logo is of the order of 4 cm.

Figure 4:
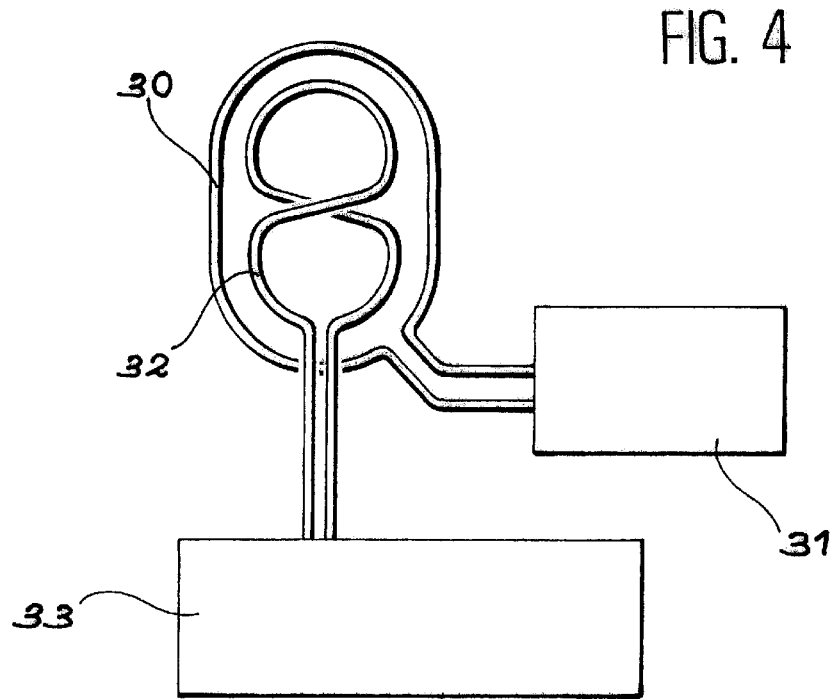
FIG. 4 shows an antenna used in a second embodiment example.

As shown in FIG. 4, the detection device can comprise:

a single loop emitter antenna 30, about 5 cm in diameter, linked to an electronic excitation device 31, emitting an alternating magnetic field of 70 Hz with peak value of 120 A/m within the loop, this value decreasing rapidly with distance, a receptor antenna 32, contiguous to the emitter antenna 30, constituted of an 8-shaped winding, linked to a detecting device for high harmonics 33: typically N×70 Hz, with 10<N<100. The emitter antenna 30 produces a nil flux on this antenna 32. But this antenna 32 is able to detect a non-homogenous induction variation in the subjacent zone, linked for example to the sudden reversal of magnetisation of a magnetic marker located under said device.

Many variants of settings of these two types of antennae 30 and 32 are evidently possible.

This detection device operates at 70 Hz, applies a field of at least 100 A/m in the detection zone, and detects the Barkhausen jump in the threads. It has a detection volume of about 5 cm×5 cm×5 cm.

REFERENCES

[1] U.S. Pat. No. 5,204,526
[2] U.S. Pat. No. 5,921,583
[3] U.S. Pat. No. 5,434,917
[4] U.S. Pat. No. 5,583,333
[5] "Ferromagnetic resonance in amorphous magnetic wires" by S. A. Baranov et al., (Phys. Met. Metall., No. 1, volume 67, pages 70 to 75, 1989).
[6] "Magnetic hysteresis in glass-covered and water-quenched amorphous wires" by H. Chiriac, T. A. Ovari, M. Vasquez and A. Hernando (Journal of Magnetism and Magnetic Materials 177–181, 1998, pages 205 and 206).
[7] French patent application 98 06 743 filed on May 28, 1998 (FR-A-2 779 266). [8] WO 98 36393

What is claimed is:

1. A system for authenticating manufactured articles (10) provided with magnetic markings, by means of a device (11) for detecting such markings, wherein each marking comprises at least one amorphous ferromagnetic filament (17), of predetermined length having a substantially cylindrical cross-section with a diameter of less than 20 $\mu$m enclosed in a glass sheath of a thickness of less than 10 $\mu$m, characterized in that each marked article comprises one or several ferromagnetic filaments having a saturation field of between at least 320 A/m and 1700 A/m and having a total mass lower than 1 mg, and in that the detection device (11) is a portable device for excitation and detection of such ferromagnetic filaments, able to be hand-held, to create a magnetic field in a detection zone of volume comprised between $10^{-3}$ dm$^3$ and 1 dm$^3$.

2. The system to claim 1, wherein the number of ferromagnetic filaments (17) is less than 10.

3. The system according to claim 1, wherein each ferromagnetic filament (17) has a length comprised between 1 cm and 10 cm.

4. The system according to claim 1, wherein the ferromagnetic filaments (17) comprise constituents selected from the group consisting of Co, Fe, Si, B, Mo, Zr, Ge, Cr, Ni, Mn, V, Ti and C with between 18 and 35% of (Si+B), and of Co or Fe at more than 40%.

5. The system according to claim 4, wherein the content of the ferromagnetic filaments (17) elements: Ni, Mo, Zr, Ge, Cr, Mn, V, Ti, C is lower than 7%.

6. The system according to claim 1, wherein ferromagnetic filaments (17) have negative magnetostriction.

7. The system according to claim 1, wherein the filaments (17) have positive magnetostriction.

8. A method for authentication of a manufactured article (10), comprising:
   at least one ferromagnetic filament (17) integrated into said article with said filament having a predetermined length and being substantially cylindrical in cross-section with a diameter of less than 20 $\mu$m and being enclosed in a glass sheath of thickness less than 10 $\mu$m, said filament having a saturation field of between at least 320 A/m and 1700 A/m in a part of this article, the total mass of the magnetic filament(s) being lower than 1 mg, the latter is identified by means of a hand-held portable excitation-detection device (11), which creates a magnetic field in a detection zone with a volume comprised between $10^{-3}$ dm$^3$ and 1 dm$^3$.

9. The method according to claim 8, wherein the number of ferromagnetic filaments (17) is less than 10.

10. The method according to claim 8, wherein the filaments (17) are assembled by planting, or by stitching.

11. The method according to claim 8, wherein the filaments (17) are inserted in a textile label or in a textile logo.

12. The method according to claim 8, wherein the filaments (17) are inserted by sewing, stitching or embroidery methods when the fabric is woven.

13. The method according to claim 8, wherein the ferromagnetic filaments (17) are incorporated in a textile thread, which is then used during production of the fabric, or during the operations of sewing or embroidery, or of overstitching.

14. The method according to claim 8, wherein the authentication is carried out at several centimeters from the article.

* * * * *